No. 784,537. PATENTED MAR. 14, 1905.
E. BEARSS.
DEFLECTOR FOR AIR BRAKES.
APPLICATION FILED AUG. 12, 1904.
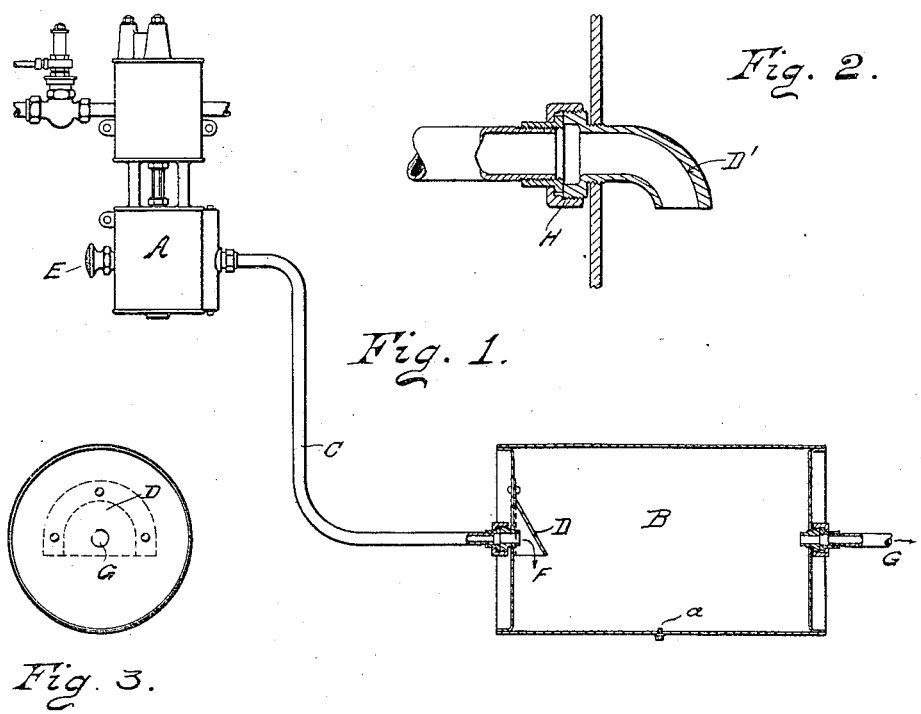

No. 784,537. Patented March 14, 1905.

UNITED STATES PATENT OFFICE.

EUGENE BEARSS, OF ELLENVILLE, NEW YORK.

DEFLECTOR FOR AIR-BRAKES.

SPECIFICATION forming part of Letters Patent No. 784,537, dated March 14, 1905.

Application filed August 12, 1904. Serial No. 220,579.

*To all whom it may concern:*

Be it known that I, EUGENE BEARSS, of Ellenville, in the county of Ulster and State of New York, have invented new and useful Improvements in Deflectors for Air-Brakes, of which the following is a full and clear description and with the accompanying drawings is a specification.

The question of so-called "frozen triples" or "train-pipes" is one of the most serious obstacles to the perfect working of the train air-brake in winter-time, and the loss of many lives and much property has resulted from failure of the air-brake apparatus to operate at a time when ice has formed in the triples or in the couplings or other low pockets in the train-pipes, and thus obstructing the flow of air. To overcome this difficulty and to separate the moisture from the compressed air has been the desire of all users of the air-brake, and many devices have been tried for this purpose, one of which is to pass the compressed air through a series of pipes forming a radiator, and thus cooling the air before it passes into the reservoir from the pump. Another has used two reservoirs as radiators with the aim of cooling the air and collecting the moisture, but with unsatisfactory results.

My invention accomplishes the desired results by the use of a deflector changing the direction of the air after entering the main reservoir, and all moisture, grit, and dirt which may be drawn into the pump through the strainer are deflected downward and deposited in the main reservoir and can be drawn off from time to time.

In the drawings attached, Figure 1 is a general view of the air-pump delivery-pipe and main reservoir, the latter in section; Fig. 2, a modified form of deflector. Fig. 3 is an end view of reservoir.

In the ordinary process of compressing the air for use in a train air-brake the free air is taken into the pump A through a strainer E, and dust and moisture in the atmosphere that pass through the strainer E are forced under pressure through the delivery-pipe C and into the main reservoir B. In cases where the air is taken from the reservoir at a point opposite or level with the inlet F a current forms between the inlet and outlet, and the moisture and dirt, commingled with air, pass through to engineer's valve and to train-line air-pipe and triples, and when the air is cooled the moisture collects at the lowest pockets or recesses, and in freezing weather the brakes are inoperative from this cause.

It is generally understood that free air being compressed by an air-pump to ninety or one hundred pounds pressure (which is the pressure usually maintained in the main reservoir) becomes heated, and moisture in the air passes with it readily through the air-brake apparatus until it is condensed, which is done by cooling the air. By forcing the heated air downward to the outer periphery of the main reservoir it becomes cooled, as the outer shell is generally as cold as the atmosphere, and the moisture being heavier than the air settles in the reservoir and can be drawn off at will.

By reference to Fig. 1 it will be seen that I have placed a deflector D inside of main reservoir B in front of the inlet-opening F, and air or any other substances entering under pressure will be directed downward by this deflector D, and the heated air coming in contact with the colder shell of the reservoir B the moisture forms in drops or beads and collects at this point, and the air being relieved of same passes through outlet G to engineer's valve and train-line. This deflector D is semiconical in form and has its base open and terminating at a point slightly below the inlet-opening F. In Fig. 1 the deflector in main reservoir is shown riveted to the inside end of the main reservoir and so placed as to cover the inlet-opening F, so that nothing can enter the reservoir without impinging against the deflector. This can be used only where new reservoirs are so manufactured; but for application to reservoirs which are now in use the device shown in Fig. 2 will give the same results. This deflector is screwed into the end of reservoir B and is easily and readily applied or removed, and the delivery-pipe is attached to same by a union H. By depositing the moisture and grit and dirt in the reservoir it has been clearly demonstrated that the life of the rotary valve in engineer's valve has been very much increased and that wear on the moving parts of triples is reduced very materially with a corresponding decrease in the cost of repairs and renewals, besides diminishing the chances of a failure of the airbrake from freezing. The portion of the deflector D' directly opposite the inlet-opening is greatly thickened or reinforced in order that the period of its utility will be prolonged, as this portion of the deflector is subjected to a large amount of wear.

I would state that this invention is used particularly on that arrangement of air-brakes wherein the main reservoir is placed horizontally with the locomotive-boiler and where the inlet F and the outlet G are in the ends of reservoirs, as in Fig. 1, for in this position it is readily seen that any dirt or moisture entering the reservoir at F would pass with the current through the outlet G and from thence to the engineer's valve and train-line unless otherwise obstructed by a deflector; but in other forms or arrangements of the piping of the reservoir the same conditions are met, but perhaps with a more indirect passage of air, and thus retaining some of the moisture.

Having thus described my invention, I claim and desire to secure by Letters Patent—

1. In combination, an air-reservoir having oppositely-opposed inlet and outlet openings and a deflector for the inlet-opening adapted to force air from the inlet-opening toward the walls of the reservoir, said deflector terminating at a point slightly below the inlet-opening, said deflector having its portion opposite the inlet-opening reinforced.

2. In combination, an air-reservoir having inlet and outlet openings, and a removable deflector for the inlet-openings, said deflector having a portion reinforced.

3. In combination, an air-reservoir, having inlet and outlet openings and a deflector for the inlet-opening insertible through said opening, said deflector having a portion reinforced.

In testimony whereof I have signed my name to this specification in the presence of two subscribing witnesses.

EUGENE BEARSS.

Witnesses:
F. J. MINSHULL,
F. MAC PHILLAMY.